(12) United States Patent
Tronc et al.

(10) Patent No.: US 9,664,311 B2
(45) Date of Patent: May 30, 2017

(54) FLEXIBLE SUBMARINE PIPE COMPRISING A LAYER COMPRISING A POLYMER RESIN COMPRISING ALUMINOSILICATE OR MAGNESIUM SILICATE NANOTUBES

(75) Inventors: Frédéric Tronc, Rouen (FR); Alain Coutarel, Mont Saint Aignan (FR)

(73) Assignee: TECHNIP FRANCE (FR)

( * ) Notice: Subject to any disclaimer, the term of this patent is extended or adjusted under 35 U.S.C. 154(b) by 421 days.

(21) Appl. No.: 13/988,951

(22) PCT Filed: Nov. 24, 2011

(86) PCT No.: PCT/EP2011/070914
§ 371 (c)(1),
(2), (4) Date: May 22, 2013

(87) PCT Pub. No.: WO2012/069577
PCT Pub. Date: May 31, 2012

(65) Prior Publication Data
US 2013/0247996 A1    Sep. 26, 2013

(30) Foreign Application Priority Data
Nov. 25, 2010 (FR) ...................................... 10 59735

(51) Int. Cl.
*F16L 11/04*    (2006.01)
*F17D 1/08*    (2006.01)
(Continued)

(52) U.S. Cl.
CPC ............... *F16L 11/04* (2013.01); *B32B 1/08* (2013.01); *B32B 27/18* (2013.01); *B32B 27/34* (2013.01);
(Continued)

(58) Field of Classification Search
CPC ....... B32B 1/08; B32B 2597/00; B32B 27/18; B32B 27/34; F16L 11/04; F16L 11/083; F17D 1/08; Y10T 137/0318
(Continued)

(56) References Cited

U.S. PATENT DOCUMENTS

| 4,150,099 A | 4/1979 | Robson |
| 5,651,976 A | 7/1997 | Price et al. |

(Continued)

FOREIGN PATENT DOCUMENTS

| WO | WO 2006/120320 | 11/2006 |
| WO | WO 2008/113362 | 9/2008 |

(Continued)

OTHER PUBLICATIONS

Liu et al, entitled "Properties of halloysite nanotube-epoxy resin hybrids and the interfacial reactions in the systems", Nanotechnology 18, 2007, 455703 (9pp).*

International Search Report dated Jan. 26, 2012 issued in connection with corresponding International Patent Application No. PCT/EP2011/070914.

(Continued)

*Primary Examiner* — Yan Lan
(74) *Attorney, Agent, or Firm* — Ostrolenk Faber LLP

(57) ABSTRACT

The present disclosure relates to a flexible submarine pipe comprising a plurality of layers, at least one layer of which comprises a polymer resin comprising at least one aluminosilicate or magnesium silicate nanotube chemically bonded to the polymer by a covalent bond, the method for preparing same and the use thereof for the transport of fluids, especially hydrocarbons.

19 Claims, 3 Drawing Sheets

(51) Int. Cl.
  B32B 1/08     (2006.01)
  B32B 27/18    (2006.01)
  F16L 11/08    (2006.01)
  B32B 27/34    (2006.01)

(52) U.S. Cl.
  CPC .............. *F16L 11/083* (2013.01); *F17D 1/08* (2013.01); *B32B 2597/00* (2013.01); *Y10T 137/0318* (2015.04)

(58) Field of Classification Search
  USPC ............ 428/36.9, 36.91, 36.92, 35.7; 137/1; 138/137; 156/244.13
  See application file for complete search history.

(56) References Cited

U.S. PATENT DOCUMENTS

| | | | |
|---|---|---|---|
| 5,705,191 | A | 1/1998 | Price et al. |
| 2005/0221033 | A1* | 10/2005 | Procida ................ B29C 47/023 428/35.7 |
| 2007/0106006 | A1* | 5/2007 | Cooper et al. ................ 524/445 |
| 2007/0204929 | A1* | 9/2007 | Jarvenkyla ................ 138/145 |
| 2008/0072987 | A1 | 3/2008 | Mukawa et al. |
| 2009/0308475 | A1 | 12/2009 | Stringfellow et al. |
| 2010/0189946 | A1 | 7/2010 | Hochstetter et al. |
| 2010/0203328 | A1 | 8/2010 | Hochstetter et al. |

FOREIGN PATENT DOCUMENTS

| | | |
|---|---|---|
| WO | WO 2010/085419 A1 | 7/2010 |
| WO | WO 2011/098717 A1 | 8/2011 |

OTHER PUBLICATIONS

Written Opinion dated Jan. 26, 2012 issued in connection with corresponding International Patent Application No. PCT/EP2011/070914.
Zhu J. et al.: "Reinforcing Epoxy Polymer Composites Through Covalent Integration of Functionalized Nanotubes", Advanced Functional Materials, Wiley-VCH Verlag GmbH & Co. KGAA, DE, vol. 14, No. 7, Jul. 1, 2004, pp. 643-648, XP001199185.
Moniruzzaman M. Et al.: "Polymer Nanocomposites Containing Carbon Nanotubes", Macromolecules, American Chemical Society, Washington D.C.; U.S., vol. 39, Aug. 8, 2006, pp. 5194-5205, XP002631356.
Yuri M. Lvov, et al., "Halloysite Clay Nanotubes for Controlled Release of Protective Agents," ACS NANO, 2008, vol. 2, No. 5, pp. 814-820.
American Petroleum Institute (API), Specification for Unbonded Flexible Pipe, ANSI/API Specification 17J, Third Edition, Jul. 2008, Effective date: Jan. 1 2009, Contains API Monogram Annex as Part of US National Adoption, ISO 13628-2:2006 (Identical), Petroleum and natural gas industries—Design and operation of subsea production systems—Part 2: Unbonded flexible pipe systems for subsea and marine application, 86 pages.
American Petroleum Institute (API), Recommended Practice for Flexible Pipe, API Recommended Practice 17B, Third Edition, Mar. 2002, 166 pages.
Dmitry G. Shchukin, et al., "Active Anticorrosion Coatings with Halloysite Nanocontainers," J. Phys. Chem. C 2008, 112, pp. 958-964.
Richard C. Larock, Comprehensive Organic Transformations: A Guide to Functional Group Preparations, Second Edition, published by John Wiley & Sons, Inc., 1999, 1,313 pages.

\* cited by examiner

US 9,664,311 B2

FLEXIBLE SUBMARINE PIPE COMPRISING A LAYER COMPRISING A POLYMER RESIN COMPRISING ALUMINOSILICATE OR MAGNESIUM SILICATE NANOTUBES

CROSS-REFERENCE TO RELATED APPLICATIONS

The present application is a 35 U.S.C. §§371 national phase conversion of PCT/EP2011/070914, filed Nov. 24, 2011, which claims priority of French Application No. 1059735, filed Nov. 25, 2010, the contents of which are incorporated by reference herein. The PCT International Application was published in the French language.

BACKGROUND OF THE INVENTION

The present invention relates to a flexible submarine piper intended for transporting fluids in deep water. These fluids are notably gases or liquids, preferably hydrocarbons.

Flexible pipes for transporting hydrocarbons generally include from the outside to the inside of the piper:
- an external polymeric sheath for protecting the whole of the pipe and notably for preventing seawater from penetrating its thickness,
- tensile armouring webs,
- a pressure vault,
- a sealed internal polymeric sheath, and
- optionally a metal carcass (FIG. 1).

If the piper comprises a metal carcass, it is said to be with a rough passage (rough bore). If the pipe is without any metal carcass, it is said to be with a smooth passage. Generally for transporting hydrocarbons, a pipe including a carcass is preferred, while a pipe without any carcass will be suitable for transporting water and/or pressurized steam.

The metal carcass and the pressure vault consist of longitudinal elements wound with a short pitch, and they give the pipe its resistance to radial forces while the tensile armouring webs consist of metal wires wound with long pitches in order to absorb the axial forces.

The nature, the number, the dimensioning and the organization of the layers making up the flexible pipes are essentially related to their conditions of use and installation. The pipes may comprise additional layers to the aforementioned ones.

In the present application, the notion of a winding with a short pitch designates any helical winding with a helix angle close to 90°, typically comprised between 75° and 90°. The notion of a winding with a long pitch, as for it, covers helix angles of less than 55°, typically comprised between 25° and 55° for armouring webs.

These flexible pipes are notably suitable for the transport of fluids, notably of hydrocarbons on the seabed and this at great depths. More specifically, they are said to be of the unbonded type and they are thus described in normative documents published by the American Petroleum Institute (API), API 17J and API RP 17B.

Flexile pipes may be used at great depth, typically down to 2,500 meters deep. They allow transport of fluids, notably of hydrocarbons, having a temperature typically attaining 130° C. and which may even exceed 150° C. and an internal pressure which may attain 1 000 bars or even 1 500 bars.

The constitutive material of the internal sealed polymeric sheath should be chemically stable and capable of mechanically withstanding the transported fluid and its characteristics (composition, temperature and pressure). This material should combine characteristics of ductility, of strength over time (generally, the pipe should have a lifetime of at least 20 years), of mechanical strength, of resistance to heat and pressure. The material should notably be chemically inert towards the chemical compounds making up the transported fluid.

Pipes comprising an internal sealed polymeric sheath based on a polymer, notably on polyamide, on grafted polyethylene (Crossflex®) or on polyvinylidene fluoride, may notably be used. However, the thermo-mechanical properties of the polymers under the aforementioned conditions of use (high temperature and pressure, high acidity and presence of water) may be clearly reduced. In particular, polyamides may be degraded by hydrolysis. Further, it is difficult to use polyethylenes at temperatures above 65° C. Thus, many studies have been reported on attempting to improve these properties, in particular for improving their creep and tensile or compressive strengths and allowing their use under the aforementioned conditions of temperatures and pressure.

International application WO 2008/113362 describes a flexible pipe comprising a layer comprising a polymeric resin comprising a cationic clay of the silicate type bonded in a non-covalent way to the polymer, this clay being described as giving the possibility of increasing the resistance to corrosion and improving the mechanical strength of said layer.

However, the preparation of the layer in which the cationic clay, in the form of sheets, is homogeneously distributed, is generally not very easy. Now, the homogeneity of the layer is very substantial, since more the sheets are independent of each other and homogeneously distributed, the larger is the contact surface area between the polymer and the sheet, and the more the impact of the clay on the improvement of the properties is perceivable.

Thus, WO 2008/113362 describes a method for preparing the layer which is different from a conventional method for preparing a polymeric resin, in that it requires:
- sufficient shearing for obtaining adequate homogeneity,
- that compounding be carried out at lower temperatures than those customarily used,
- an exfoliation and/or intercalation step (intercalation of a polymer or of a quaternary amine between the sheets in order to space them apart) be added.

One of the goals of the present invention is to provide a flexible submarine pipe comprising a layer based on polymer having improved thermo-mechanical properties allowing its use for transporting fluids, such as hydrocarbons, notably at high pressure and high temperature and which may be prepared by a conventional method for preparing a polymeric resin, in particular which does not require any exfoliation step.

SUMMARY OF THE INVENTION

For this purpose, according to a first object, the object of the invention is a flexible submarine pipe intended for transporting fluids, notably hydrocarbons, comprising a plurality of layers, at least one layer of which comprises a polymeric resin comprising at least one alumino-silicate or magnesium silicate nanotube chemically bonded to the polymer through a covalent bond.

The alumino-silicate or magnesium silicate nanotube may be an aluminosilicate such as a halloysite of formula $Al_2SiO_5(OH)_4 \cdot nH_2O$ or imogolite of formula $Al_2SiO_3(OH)_4 \cdot nH_2O$, or a magnesium silicate of formula $Mg_3Si_2O_5(OH)_4 \cdot nH_2O$, wherein <<$nH_2O$>> means that the nanotubes are in a hydrated form (n being greater than 0) or not (n then representing 0). Halloysite is particularly preferred. These alumino-silicate or magnesium silicate nanotubes are advantageously commercially available for example at Natural-Nano™, Imerys®, Sigma Aldrich® or Northstar Clay mines, Inc®, or may be synthesized by methods known to one skilled in the art, for example as described in U.S. Pat. No. 4,150,099.

These nanotubes have a hollow tubular structure, said structure including two tubular sheets having the same axis: an external tubular sheet in which is located an internal tubular sheet. The chemical structure of the external tubular sheet is close of $SiO_2$.

Generally, such a nanotube has a length from 1 to 15 μm and/or an internal diameter (considering the internal tubular sheet) from 5 to 200 nm, typically from 10 to 150 nm.

The inventors have discovered that alumino-silicate or magnesium silicate nanotubes chemically bonded through a covalent bond to a polymer give the possibility of reducing the mobility of the polymer chains relatively to each other and therefore of improving the thermo-mechanical properties of the polymer, in particular improving its resistance to creep, and its tensile or compressive strength and/or its flame-retardant properties.

By an alumino-silicate or magnesium silicate nanotube <<chemically bonded>> through a covalent bond to the polymer, is meant that the nanotube comprises at least one group which may form a covalent bond with the polymer, called group A in the present application. By <<group which may form a covalent bond>> is meant any atom, any function which may form a covalent bond or any group bearing such an atom or such a function.

The chemical bond between the polymer and the alumino-silicate or magnesium silicate nanotube in the layer of the pipe is a covalent bond. This chemical bond may notably be a bond of the ester, amide, amine, ether, thioether, urea, imine, imide, sulfonamide, carbamate, phosphate, siloxane (Si—O—Si), silane (Si—C) or carbon-carbon type. Covalent bonds are advantageously the most stable chemical bond.

The polymer of the layer of the flexible pipe is a polymer capable of covalently binding to the nanotube. The polymer may include in its backbone groups capable of covalently binding to the nanotube. It may also include functional lateral chains capable of covalently binding to the nanotube. Functional lateral chains are for example lateral chains bearing COOH, $NH_2$, OH, epoxide, nitrile, anhydride, or trialkoxysilane groups. The polymer is preferably an organic polymer (i.e. including carbon atoms), and in particular for which the backbone is organic.

In a first embodiment, the polymer of the layer of the flexible pipe is a polyamide optionally including functional lateral chains notably as defined above. Polyamides are advantageous since they may be used at high temperatures, generally up to 100° C. The polyamide of the layer of the flexible submarine pipe may be a homopolyamide or a copolyamide, such as for example polyamide 6, polyamide 4.6, polyamide 6.6, polyamide 11, polyamide 12, polyamide 12.12, polyamide 10.12, polyamide 6.10, polyamide 6.12, polyamide 6.9, polyamide 9.9, polyamide 9T, polyamide 12T, polyamide 10T, polyamide 12I, polyamide 12T, polyamide 12T.12, polyamide 10T.12, polyamide 12T.106, polyamide 10T.106, polyamide 6.66, polyamide 6.612, polyamide 6.66.610, polyamide 6.66.12, polyamide 6.6T, polyamide 6T.6, polyamide 6T.12, polyamide 6T.61, polyamide 6I.6T, polyamide 6.61, polyamide 6T.66, polyamide 6T.66.12, polyamide 12.MACMI, polyamide 66.61.6T, polyamide MXD6.6, MXD10, polyphtalamide, polyarylamide, polyesteramide, polyetheresteramide, polyetheramide or mixtures thereof.

Preferably the polyamide is selected from polyamide 11, polyamide 12, polyamide 6.12 and polyphtalamide.

In a second embodiment, the polymer of the layer of the flexible pipe is a polyethylene including functional lateral chains. Polyethylene polymers are interesting since they are not degraded by hydrolysis and are inexpensive. Functional lateral chains are for example lateral chains bearing COOH, $NH_2$, OH, epoxide, nitrile, anhydride or trialkoxysilane groups, preferably trialkoxysilane, notably functional lateral chains bearing groups of formula —Si—$(OR_{10})(OR_{11})(OR_{12})$, wherein $R_{10}$, $R_{11}$ and $R_{12}$ are independent alkyl groups, preferably n-propyl, isopropyl, ethyl or methyl groups, most preferably methyl groups. For example the polyethylene may comprise lateral chains of formula —$CH_2$—$CH_2$—Si—$(OR_{10})(OR_{11})(OR_{12})$, wherein $R_{10}$, $R_{11}$ and $R_{12}$ are as defined above, in particular lateral chains of formula —$CH_2$—$CH_2$—Si—$(OMe)_3$, which are more preferred since the Si—OMe functions are easily hydrolyzable into silanol functions Si—OH. Thus, the polymer may be a Crossflex® polymer of the following formula:

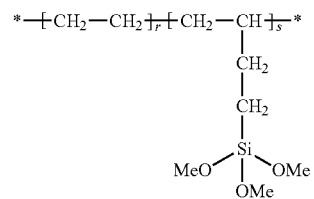 [SMILES: *CCCC(*)CC[Si](OC)(OC)OC]

Polyethylene polymers including functional lateral chains are either commercial polymers or they may be prepared by techniques known to one skilled in the art. For example polyethylene polymers including lateral chains of formula —$CH_2$—$CH_2$—Si—$(OR_{10})(OR_{11})(OR_{12})$ may be prepared by reaction between polyethylene and the vinylsilane derivative of formula $CH_2$=CH—Si—$(OR_{10})(OR_{11})(OR_{12})$ in the presence of peroxide (Sioplast process).

A flexible pipe comprising a layer including a polyethylene resin comprising at least one alumino-silicate or magnesium silicate nanotube covalently bound to the polyethylene may advantageously be used at higher temperatures than a flexible pipe comprising a layer including a polyethylene resin and in particular at temperatures compatible with use for the transport of hydrocarbons.

In a third embodiment, the polymer of the layer of the flexible pipe is a homopolymer or copolymer of polyvinylide fluoride (PVDF) including functional lateral chains. Functional lateral chains are for example lateral chains bearing COOH, $NH_2$, OH, epoxide, nitrile, anhydride or trialkoxysilane groups, preferably COOH or anhydride groups.

The layer comprising a polymeric resin comprising at least one nanotube covalently bound to the polymer of the flexible submarine pipe may also comprise additives, such as: antioxidants, plasticizers and any other fillers such as for example carbon black.

In an embodiment, said at least one nanotube of the layer of the flexible submarine pipe comprises a chemical compound.

As explained above, an alumino-silicate or magnesium silicate nanotube includes an external tubular sheet in which is located an internal tubular sheet. Now, the external tubular sheet has a negative zeta potential while the internal tubular sheet has a positive zeta potential. The positive charge of the internal cavity of the internal tubular sheet (lumen) promotes the insertion of negatively charged chemical compounds, the latter being repelled by the negatively charged external tubular sheet. The chemical compound may therefore be advantageously inserted into the internal cavity of the internal sheet or the chemical compound may also be inserted between the internal and external sheets of the nanotube. The chemical bonds between the chemical compound and the nanotube are generally ionic, hydrogen or Van der Waals bonds. Methods for preparing a nanotube in alumino-silicate or magnesium silicate comprising chemical compounds are known in the literature, for example from *J. Phys. Chem.* C 2008, 112, p. 958-964; ACS NANO Vol 2, No. 5 p. 814-820, U.S. Pat. No. 5,651,976 and U.S. Pat. No. 5,705,191.

Thus, one or more chemical compounds may be inserted into the nanotube(s) of the layer of the flexible pipe according to the invention. The addition of such a chemical compound gives the possibility of varying the physical and/or chemical properties of the layer, and therefore of the pipe. For example, the chemical compound may be:
  an anti-corrosion agent, such as hexamine, benzotriazole, phenylenediamine, dimethylethanolamine, cinnamaldehyde, ascorbic acid, and/or
  a $CO_2$ capturing agent (scavenger, for example an alkanolamine, such as monoethanolamine, triethanolamine or diisopropanolamine), an $H_2S$ capturing agent (for example triazine or one of its derivatives, such as hexahydrotriazine, or a mixture of zinc chloride and polyphenolic acid, a condensate of aldehyde and alkanolamine), an $O_2$ capturing agent (for example hydrazine, hydroquinone, trimethylpyrrole, erythorbate, diethylhydroxylamine, carbohydrazide) and/or $CH_4$ capturing agent, these gases being typically released again during the transport of hydrocarbons, and/or
  an antioxidant agent, such as a thiol or one of its derivatives (notably a thioester), a phenolic derivative (notably 2,4-di-tert-butylphenol), an HALS ("Hindered Amine Light Stabilizer", a derivative of 2,2,6,6-tetramethylpiperidine), a phosphite, (notably di-tert-butylphenylphosphite).

When the flexible pipe is used for transporting a fluid, this chemical compound may remain inside the internal cavity of the nanotube or be released.

The layer comprising a polymeric resin comprising at least one alumino-silicate or magnesium silicate nanotube covalently bonded to the polymer may notably be the internal sealed polymeric sheath in a flexible submarine pipe as defined above, but it may also be an intermediate layer located between two other layers, notably an adhesive layer used between two layers.

The flexible submarine pipe according to the invention comprises a plurality of layers, i.e. at least two layers. In an embodiment, the flexible submarine pipe comprises, in addition to the layer comprising a polymeric resin comprising at least one alumino-silicate or magnesium silicate nanotube chemically bonded to the polymer through a covalent bond, one or more of the following layers:
  an external polymeric sheath, and/or
  at least one tensile armouring web, and/or
  optionally a pressure vault, and/or
  optionally a metal carcass.

According to a second object, the invention relates to a method for preparing the aforementioned flexible submarine pipe, comprising the following steps:
a) mixing a polymer and at least one alumino-silicate or magnesium silicate nanotube bearing at least one group A which may form a covalent bond with said polymer,
b) extruding in order to form a layer comprising said resin,
c) assembling the layer obtained in step b) with at least one other layer.

The advantage of alumino-silicate or magnesium silicate nanotubes is that they are discrete nanoparticles, which do not aggregate or only very little with each other like clay sheets, as applied in the polymeric resin layer described in WO 2008/113362. Thus, the step for forming the polymeric resin of the preparation method according to the invention is generally without any exfoliation step, and may be carried out under customary conditions for forming any polymeric resin. The preparation method is therefore simple and the cost for preparing the polymeric resin layer and therefore the flexible pipe is reduced.

The polymer applied in the method is as defined above.

Generally, said at least one group A which may form a covalent bond with said polymer is a substituent of the external tubular sheet of the nanotube, the chemical structure of which is close to that of $SiO_2$. Typically, said at least one group A is a substituent of one of the silicon atoms of the external tubular sheet, such as for example illustrated in FIG. 2.

Said group A which may form a covalent bond with same polymer is generally either:
  a group G selected from:
  a group selected from a halogen, —OH, —COOH, —$NH_2$, —SH, —OSi($R_7$)($R_8$)($R_9$) and an alkoxyl and
  a saturated, unsaturated or aromatic, linear, branched or cyclic hydrocarbon chain, substituted with one or more groups selected from a halogen Hal, —CO-Hal, —OCO-Hal, —$SO_2$-Hal, —COOH, —OH, —SH, —CN, —NCO, —OSi($R_7$)($R_8$)($R_9$), —$CR_1R_2$-Hal, —$NR_1$H,

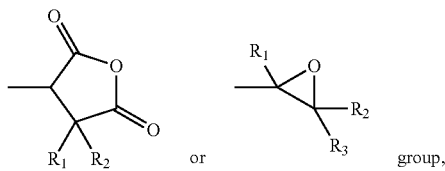

wherein:
$R_7$, $R_8$ and $R_9$ represent independently OH, an alkyl or an alkoxyl,
$R_1$, $R_2$ and $R_3$ represent independently H or a saturated, unsaturated or aromatic, linear, branched or cyclic hydrocarbon chain, itself optionally substituted with one or more of the groups selected from a halogen or a —CO-Hal, —OCO-Hal, —$SO_2$-Hal, —$COOR_4$, —$COR_4$, —$CR_4R_5$-Hal, —$OR_4$, —$SR_4$, —$NR_4R_5$, $NR_4COR_5$, —$COR_4NR_5$, —$NR_4$—CO—$NR_5R_6$, —O—CO—$NR_4$, —$NR_4$—CO—$OR_5$, —CN, —$NO_2$, —NCO,

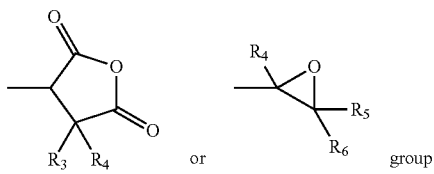

or group wherein $R_4$, $R_5$ and $R_6$ represent independently H or a saturated unsaturated or aromatic, linear, branched or cyclic hydrocarbon chain, Hal represents a halogen selected from chlorine, bromine and iodine, or either a —O—POSS group, wherein POSS is a polyhedral oligomeric silsesquioxane:

of formula $(RSiO_{1.5})_x$ wherein x represents an integer greater than or equal to 6 and less than or equal to 12, x representing the degree of polymerization, and R represents:
  a group G as defined above, or
  a saturated, unsaturated or aromatic linear, branched or cyclic hydrocarbon chain,
  it being understood that the groups R of each $RSiO_{1.5}$ group may be identical or different from each other and that at least one group R represents a group G, or of formula $[(RSiO_{1.5})_{x'}(XRSiO_{1.0})_{x''}]$, wherein:
  x' and x" represent independently of each other an integer with x" different from 0, while the sum of x' and of x" is greater than or equal to 6 and less than or equal to 12, and
  R is as defined above, and
  X represents a group G as defined above, the groups X of each group $XRSiO_{1.0}$ may be identical or different from each other and identical with or different from the R's, It being understood that adjacent groups A may be bound to each other through a POSS.

Thus, said group A is generally selected from a group G and an O—POSS, the POSS being of formula $(RSiO_{1.5})_x$ or $[(RSiO_{1.5})_{x'}(XRSiO_{1.0})_{x''}]$. The group G may form a covalent bond with the polymer. The group A should therefore comprise a group G. Thus, at least one group R and/or X of formulae $(RSiO_{1.5})_x$ and $[(RSiO_{1.5})_{x'}(XRSiO_{1.0})_{x''}]$ represents a group G.

A POSS of formula $(RSiO_{1.5})_x$ has a structure in the form of a <<cage>> including silicon and oxygen atoms, and wherein each silicon atom bears a substituent R. These POSSes may for example have one of the following structures:

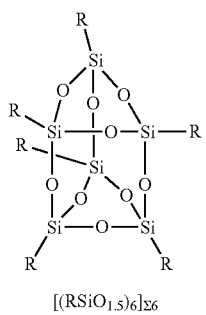

$[(RSiO_{1.5})_6]\Sigma 6$

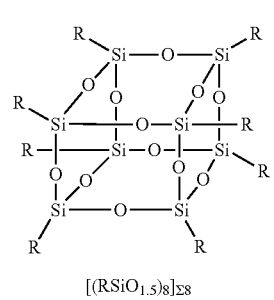

$[(RSiO_{1.5})_8]\Sigma 8$

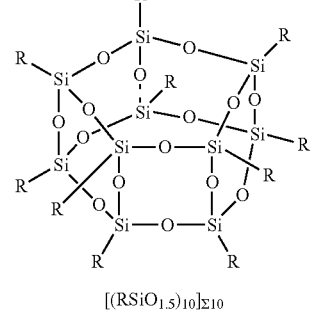

$[(RSiO_{1.5})_{10}]\Sigma 10$

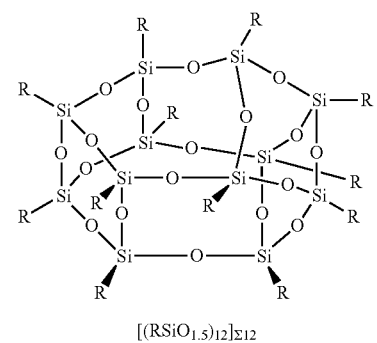

$[(RSiO_{1.5})_{12}]\Sigma 12$

A POSS of formula $[(RSiO_{1.5})_{x'}(XRSiO_{1.0})_{x''}]$ is a POSS in which certain of the Si—O—Si functions are broken (a partly open <<cage>>) as illustrated in the diagram below. The silicon atoms located at the opening of the cage are substituted with groups R and X. The silicon atoms of the cage are substituted with groups R.

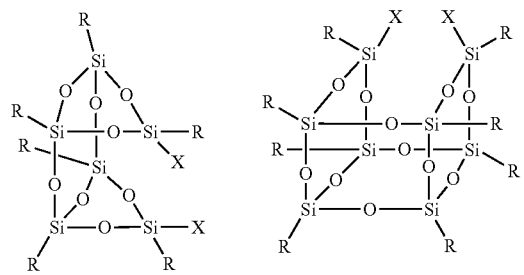

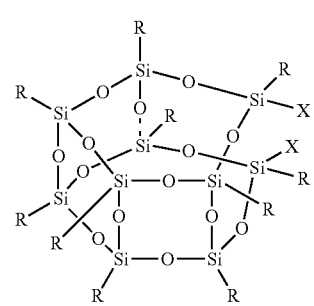

-continued

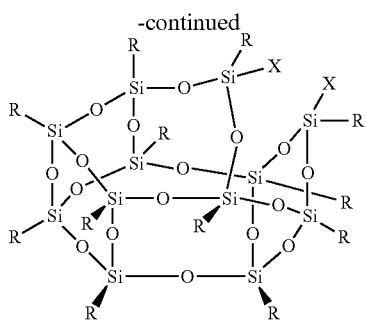

For example, the following diagram illustrates POSSes of formula $[(RSiO_{1,5})_{x'}(XRSiO_{1,0})_{x''}]$ wherein a function Si—O—Si is in a hydrolyzed form (X represents OH).

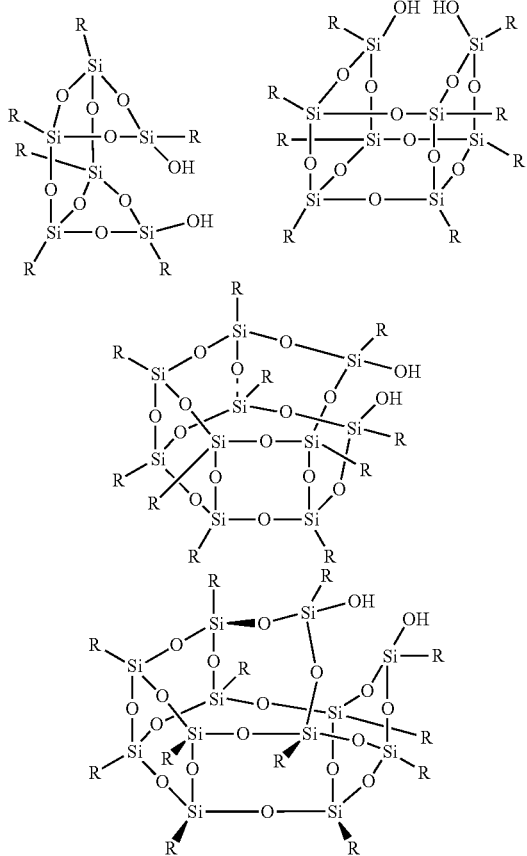

Thus, the nanotube of the layer of the flexible pipe according to the invention may for example have one of the structures illustrated in the appended FIGS. 3 and 4. In FIG. 4 the structure of the POSS illustrated is simply illustrative: the POSS may have any structure fitting one of the formulae $(RSiO_{1,5})_x$ or $[(RSiO_{1,5})_{x'}(XRSiO_{1,0})_{x''}]$.

Two adjacent groups A may be bound to each other through a POSS. For example, said at least one nanotube of the layer of the flexible pipe may have the structure illustrated in the appended FIG. 5.

Preferably, the group A which may form a covalent bond with said polymer is selected from:
a group G' selected from an alkoxyl, —OH and —OSi $(R_7)(R_8)(R_9)$, wherein $R_7$, $R_8$ and $R_9$ independently represent OH, an alkyl or an alkoxyl, and
a group O-POSS, wherein POSS is:
of formula $(R'SiO_{1,5})_x$ wherein x represents an integer greater than or equal to 6 and less than or equal to 12, and wherein R' represents:
a group G' as defined above, or
a saturated, unsaturated or aromatic linear, branched or cyclic hydrocarbon chain,
it being understood that the groups R' of each group $R'SiO_{1,5}$ may be identical or different from each other and that at least one group R' represents a group G', or
of formula $[(R'SiO_{1,5})_{x'}(G'R'SiO_{1,0})_{x''}]$, wherein:
x' and x" represent independently of each other an integer, such that the sum of x' and of x" is greater than or equal to 6 and less than or equal to 12, and R' is as defined above, and
the groups G' of each group $G'R'SiO_{1,0}$ may be identical or different from each other and identical or different from the R's.

The groups A selected from the groups G as defined above, and notably from the groups G' as defined above, are more preferred.

In the sense of the present application, a halogen is selected from a fluorine, a bromine, an iodine and a chlorine, notably a bromine, an iodine and a chlorine, preferably a chlorine.

A hydrocarbon chain preferably comprises from 1 to 10 carbon atoms, notably from 2 to 6 carbon atoms. The preferred hydrocarbon chains are alkyl groups (preferably having from 1 to 10 carbon atoms, in particular from 2 to 6), alkenyl groups (preferably having from 2 to 10 carbon atoms, in particular from 2 to 6), aryl groups (preferably having from 6 to 10 carbon atoms), arylalkyl groups preferably having from 7 to 10 carbon atoms) or alkylaryl groups (preferably having from 7 to 10 carbon atoms). The vinyl group is the preferred alkenyl group. The phenyl group is the preferred aryl group.

The alkyl groups preferably have from 1 to 10 carbon atoms, in particular from 2 to 6. An alkoxyl group is an —O-alkyl group.

During step a), at least one covalent bond is formed between the polymer and the nanotube.

As an illustration, a group A bearing a:
halogen function may form an amine bond with an amine function of the polymer (by nucleophilic substitution), notably when the polymer is a polyamide,
a hydroxyl function may form an ester bond with a carboxylic acid function of the polymer, notably when the polymer is a polyamide or when the polymer is a PVDF including lateral chains comprising COOH and/or anhydride groups, or may form a siloxane bond with a trialkoxysilane group of the polymer, notably when the polymer is a polyethylene including lateral chains bearing trialkoxysilane groups, for example of the Crossflex type,
a thiol function may form a thioester bond with a carboxylic acid function of the polymer, notably when the polymer is a polyamide or when the polymer is a PVDF including lateral chains comprising COOH and/or anhydride groups,
an epoxide function may form an ester bond with a carboxylic acid function of the polymer and/or an amine bond with an amine function of the polymer, notably when the polymer is a polyamide,
an amine function may form an amide bond with a carboxylic acid function of the polymer, notably when the polymer is a polyamide or when the polymer is a PVDF including lateral chains comprising COOH and/or anhydride groups, a carboxylic acid function, acyl chloride or anhydride function may form an amide bond with an amine function of the polymer, notably when the polymer is a polyamide, an isocyanate function may form an urea bond with an amine function of the polymer, notably when the polymer is a polyamide, a chloroformate function may form a carbamate bond with an amine function of the polymer, notably when the polymer is a polyamide, a sulfonyl chloride function may form a sulfonamide bond with the amine function of the polymer, notably when the polymer is a polyamide, an alkoxyl function may form a siloxane bond with a trialkoxysilane group of the polymer, notably when the polymer is a polyethylene including lateral chains bearing trialkoxysilane groups, for example of the Crossflex® type, an —OSi($R_7$)($R_8$)($R_9$) function wherein $R_7$, $R_8$ and $R_9$ represent independently OH or an alkoxyl may form a siloxane bond with a trialkoxysilane group of the polymer, notably when the polymer is a polyethylene including lateral chains bearing trialkoxysilane groups, for example of the Crossflex type.

The following embodiments are particularly preferred for step a):

the polymer is a polyamide optionally comprising functional lateral chains and said at least one nanotube is a bearer of at least one —OH, $NH_2$ or COOH group, (whereby ester or amide bonds are typically formed during the process), the polymer is a polyethylene including functional lateral chains bearing groups of formula —Si—($OR_{10}$)($OR_{11}$)($OR_{12}$), wherein $R_{10}$, $R_{11}$ and $R_{12}$ are independently alkyl groups, preferably a crossflex polymer, and said at least one nanotube is bearer of at least one —OH, —OSi($R_7$)($R_8$)($R_9$) or alkoxyl group wherein $R_7$, $R_8$ and $R_9$ represent independently OH, an alkyl or an alkoxyl, (whereby bonds of the siloxane type are typically formed during the process), the polymer is a polyvinylidene fluoride (PVDF) including functional lateral chains bearing COOH or anhydride groups, and said at least one nanotube is a bearer of at least one —OH group, (whereby ester bonds are typically formed during the process).

As an illustration, the reaction between a PVDF including functional lateral chains bearing anhydride groups with a nanotube bearing an —OH group (A represents —OH) is illustrated in diagram 1 below. A covalent bond of the ester type is then formed between the nanotube and the polymer during the method according to the invention.

Scheme 1: reaction between a PVDF including functional lateral chains bearing anhydride groups with a nanotube bearing an —— OH group.

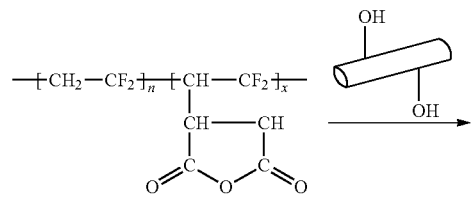

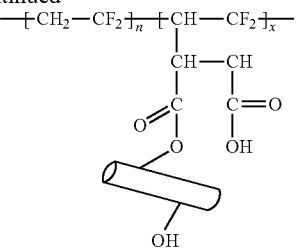

In a preferred embodiment, the covalent bond which may be formed between the group A borne by the alumino-silicate or magnesium silicate nanotube and the polymer, is a siloxane bond. Generally, in this embodiment, and in particular when the polymer is a polyethylene including lateral chains bearing trialkoxysilane groups, for example of the Crossflex® type and that the group A bears a hydroxyl, alkoxyl or trialkoxysilane function (notably —OSi($R_7$)($R_8$)($R_9$) wherein $R_7$, $R_8$ and $R_9$ are as defined above), the method comprises a subsequent step d) for cross-linking of the assembly obtained during step c). This cross-linking is generally achieved by putting said assembly in the presence of water (or of humidity) at high temperatures, notably from 85 to 99° C., preferably from 95 to 98° C., for example by immersion in hot water or by circulation of hot water. The duration of the cross-linking step d) is variable, and notably depends on the thickness of the layer comprising the polymeric resin comprising alumino-silicate or magnesium silicate nanotubes.

The mixing of step a) may notably be made by melt mixing the polymer, by compounding, extrusion, reactive extrusion (i.e. by carrying out steps a) and b) simultaneously). Except when step a) is carried out by reactive extrusion, the mixture of steps a) may be used either in a master mixture or in a main matrix in order to form the layer comprising the polymeric resin.

The polymeric resin may be made by using the usual equipment for preparing a polymeric resin. In particular, no adaptation of the temperature during compounding, of the specific shearing or of an exfoliation step is required during step a) according to the invention, unlike the method as described in WO 2008/113362. Typically, step a) (and therefore the method according to the invention) is without any exfoliation step.

Generally, in step a) of the method, when the mixture of the polymer and of at least one nanotube forms the main matrix, 1 to 10% by weight, preferably 2 to 5% by weight of nanotubes are used based on the total weight of the mixture. When the mixture of the polymer and of nanotubes is used as a master mixture, the mass percentage of nanotubes in polymer resin may attain 30% or even 50%.

During step a) of the method, additives may added, in particular the aforementioned ones.

The method may comprise a chemical coupling step for forming a covalent bond between said group and the functions of the polymer.

This chemical coupling step may notably be a hydrolysis notably an acid hydrolysis. For example:

if the polymer is a polyethylene including lateral chains bearing a trialkoxysilane group, preferably of formula —$CH_2$—$CH_2$—Si—($OR_{10}$)($OR_{11}$)($OR_{12}$), a hydrolysis allows hydrolysis of the trialkoxysilane group into a silanol group, capable of binding to at least one hydroxyl group borne by a nanotube by forming a siloxane bond (Si—O—Si), if the polymer is a polyethylene including lateral chains bearing a trialkoxysilane group, preferably of formula —$CH_2$—$CH_2$—Si—$(OR_{10})(OR_{11})(OR_{12})$, a hydrolysis allows hydrolysis of the trialkoxysilane group into a silanol group and if the nanotube includes at least one trialkoxysilane group hydrolyzable into a silanol group, the thereby formed silanol groups on the nanotube and the polymer may be fused together by forming a siloxane bond, if the polymer is a polyethylene including lateral chains bearing a trialkoxysilane group, preferably of formula —$CH_2$—$CH_2$—Si—$(OR_{10})(OR_{11})(OR_{12})$, a hydrolysis allows hydrolysis of the trialkoxysilane group into a silanol group and if a nanotube includes at least one alkoxyl group hydrolyzable into a silanol group (the alkoxyl group being borne by a silicon atom of the external sheet of the nanotube), the silanol groups on the nanotube and the polymer may fuse together by formation of a siloxane bond.

The chemical coupling step may be catalyzed, notably by heat, radiations and/or a catalyst.

For example, if the polymer bears a carboxylic acid function, the esterification reaction between the hydroxyl function borne by a nanotube and the carboxylic acid function of a polymer may be catalyzed by a base. It is within the reach of one skilled in the art of adapting the chemical coupling conditions (temperature, pressure, use of a catalyst, reaction time) in order to allow generation of a covalent bond.

In another example, the aforementioned steps of hydrolyses of alkoxysilane or trialkoxysilane groups into silanol groups when the nanotube bears at least one trialkoxysilane or alkoxyl group and/or the polymer includes trialkoxysilane groups, may be catalyzed by an acid. Also, the fusion step between the nanotube and the polymer for forming a siloxane bond may be catalyzed by an acid, or even by an acid and by heat.

The method according to the invention may also comprise beforehand or simultaneously with step a) a step for preparing an alumino-silicate or magnesium silicate nanotube bearing at least one group A as defined above, for example by grafting of a group bearing at least one group A as defined above on an alumino-silicate or magnesium silicate commercial nanotube (which is generally a bearer of —SI—OH groups, the hydroxyl function may be grafted by a group bearing at least one group A as defined above by methods known to one skilled in the art, notably described in <<Comprehensive Organic Transformations: A Guide to Functional Group Preparations>> of R. C. Larock, published by John Wiley & Sons Inc.).

The polymer may also be prepared during step a).

Thus, in a first embodiment, when the polymer is a polyethylene polymer including lateral chains of formula —$CH_2$—$CH_2$—Si—$(OR_{10})(OR_{11})(OR_{12})$ wherein $R_{10}$, $R_{11}$ and $R_{12}$ are as defined above, step a) may include the following steps:

$a_1$) melting a polyethylene polymer, $a_2$) adding a vinylsilane derivative of formula $CH_2$=CH—Si—$(OR_{10})(OR_{11})(OR_{12})$, a peroxide initiator and at least one alumino-silicate or magnesium silicate nanotube bearing a hydroxyl, trialkoxysilane or alkoxyl group in order to obtain a polyethylene including functional lateral chains, $a_3$) mixing with polyethylene, a catalyst of the cross-linking reaction, optionally an antioxidant and/or a stabilizer, it being understood that the steps $a_2$, $a_3$ and b) may be carried out simultaneously.

The peroxide initiator may notably be dicumyl peroxide or 1,1-(t-butylperoxy 3,3,5-trimethylcyclohexane (Lupersol L231).

The catalyst of the cross-linking reaction may notably be dibutyltin laurate (DBTL) or dioctyltin laurate (DOTL).

The antioxidant may notably be a hindered phenolic compound, such as the Irganox® (Ciba-BASF) or Hostanox® (Clariant) compound.

The stabilizer may notably be a hindered amine light stabilizer (HALS) such as Chimassorb®, Tinuvin® or Irgastab® (Ciba-BASF).

The mixture of polyethylene, of the catalyst of the cross-linking reaction, of the antioxidant and of the stabilizer is a master mixture for polyethylene including lateral chains of formula —$CH_2$—$CH_2$—Si—$(OR_{10})(OR_{11})(OR_{12})$.

The nanotubes bearing at least one hydroxyl, trialkoxysilane or alkoxy group are preferentially added during step $a_2$), simultaneously or separately to the vinylsilane derivative. Indeed, it is generally preferred to avoid adding a nanotube during step $a_3$) for avoiding a chemical reaction between the catalyst of the cross-linking reaction and the nanotube and therefore their degradations.

The steps $a_1$), $a_2$) and $a_3$) are then followed by step b), (extrusion), c) (assembly with other layers) and d) (cross-linking) as defined above.

Step d) then comprises the aforementioned hydrolysis step allowing formation of the siloxane bonds.

This first embodiment may also comprise prior to step $a_2$) a step for preparing an alumino-silicate or magnesium silicate nanotube bearing at least one group A as defined above.

In a second embodiment, both the polymer and said at least one alumino-silicate or magnesium silicate nanotube bearing a hydroxyl, trialkoxysilane or alkoxyl group are formed during step a).

Typically, when the polymer is a polyethylene polymer including lateral chains of formula —$CH_2$—$CH_2$—Si—$(OR_{10})(OR_{11})(OR_{12})$ wherein $R_{10}$, $R_{11}$ and $R_{12}$ are as defined above, step a) may include the following steps:

$a_1$) melting a polyethylene polymer, $a_2$) adding a vinylsilane derivative of formula $CH_2$=CH—Si—$(OR_{10})(OR_{11})(OR_{12})$, a peroxide initiator and at least one alumino-silicate or magnesium silicate nanotube bearing a hydroxyl group in order to obtain a polyethylene including functional lateral chains, $a_3$) mixing with polyethylene, a catalyst of the cross-linking reaction, optionally an antioxidant and/or a stabilizer, it being understood that the steps $a_2$, $a_3$ and b) may be carried out simultaneously.

During step $a_2$) are formed 1) at least one alumino-silicate or magnesium silicate nanotube bearing a group —O—Si—$(OR'_{11})(OR'_{12})$—CH=$CH_2$ wherein $R'_{11}$ and $R'_{12}$ correspond to $R_{10}$, $R_{11}$ or $R_{12}$ (reaction between the vinylsilane and the nanotube) and 2) a polyethylene polymer including lateral chains of formula —$CH_2$—$CH_2$—Si—$(OR_{10})(OR_{11})(OR_{12})$ (reaction between the polyethylene polymer and the nanotube).

Steps $a_1$), $a_2$) and $a_3$) are then followed by step b) (extrusion), c) (assembling with other layers) and d) (cross-linking) as defined above.

Step d) then comprises the aforementioned hydrolysis step allowing the formation of siloxane bonds by fusion of the group —O—Si—$(OR'_{11})(OR'_{12})$—CH=$CH_2$ borne by said at least one alumino-silicate or magnesium silicate nanotube and lateral chains of formula —$CH_2$—$CH_2$—Si—$(OR_{10})(OR_{11})(OR_{12})$ of the polyethylene polymer.

However, in this second embodiment, during step $a_2$), there is a competition between both reactions 1) and 2), and this step $a_2$) is therefore generally more difficult to control than step $a_2$) of the first embodiment above. Therefore, when it is desired that the method includes both the preparation of the polymer and of said at least alumino-silicate or magnesium silicate nanotube bearing a hydroxyl, trialkoxysilane or alkoxyl group, the first embodiment above comprising prior to step $a_2$) a step for preparing an alumino-silicate or magnesium silicate nanotube bearing at least one group A as defined above, is preferred.

When the nanotube comprises a chemical compound (anti-corrosion agent, $CO_2$, $H_2S$, $O_2$ and/or $CH_4$ sensor or compatibilizing agent), step a) is carried out as discussed above, by replacing the nanotube with a nanotube comprising a chemical compound.

When the nanotube only comprises a group A which may form a covalent bond, a polymer comprising a modified functional group, the molecular mass of which is increased, is obtained.

When the nanotube has two groups A which may form a covalent bond, the nanotube may react with two distinct polymeric chains, which allows an increase in the molecular mass of the obtained polymer.

When the nanotube has more than three groups A which may form a covalent bond, the nanotube may react with more than three distinct polymeric chains, which allows an increase in the molecular mass of the obtained polymer and generation of cross-linking points.

Thus, the more the nanotube comprises groups A which may form a covalent bond, the more the molecular mass of the polymer increases. Thus, the use of nanotubes comprising two, three or more than three groups A is preferred during step a). Indeed, the increase in the molecular mass and/or in the number of cross-linking points gives the possibility of decreasing the mobility of the chains of polymers relatively to each other and of thereby obtaining a polymer having improved thermo-mechanical properties. A flexible underwater pipe comprising such a polymer is therefore suitable for being used for the transport of fluids under high pressure and high temperature, notably hydrocarbons.

The extrusion step b) may be carried out by any method known to one skilled in the art.

Generally, the resin obtained at the end of step a) is dried, typically in an oven at a temperature of more than 70° C., generally for several hours, for example four hours at 80° C., in order to feed a single-screw or twin-screw extruder. It is also possible to use a reactive extruder and in this case the steps a) and b) are simultaneous since the mixing between the nanotube(s) and the polymer and the extrusion are accomplished in the same tooling, or in a co-extruder giving the possibility of making a layer comprising a polymeric resin comprising at least one nanotube chemically covalently bound to the polymer.

The layer comprising the resin obtained at the end of step b) is typically tubular, generally has a diameter from 50 mm to 600 mm, preferably from 50 to 400 mm, a thickness of 1 mm to 150 mm, preferentially from 40 to 100 mm and a length from 1 m to 10 km.

The method comprises step c) for assembling the layer obtained during step b) with at least one other layer in order to form the flexible submarine pipe, notably with an external polymeric sheath, a tensile armouring web, optionally a pressure vault, and optionally a metal carcass.

In an embodiment, the extrusion of the mixture obtained in step a) is achieved on another layer, typically the carcass, in order to obtain an assembly (carcass/layer in polymeric resin comprising at least one nanotube chemically bound to the polymer covalently) which will then be added and calendered with at least one other layer during step c), typically a pressure vault, tensile armouring webs and an external polymeric sheath. This embodiment notably gives the possibility of making flexible pipes with a rough passage (rough bore).

In another embodiment, the extrusion of the mixture obtained in step a) is independent and the layer obtained at the end of step b) is then added and calendered with at least one other layer during step c), typically a pressure vault, tensile armouring webs and an external polymeric sheath. This embodiment notably gives the possibility of making flexible pipes with a smooth passage (smooth bore).

The layers are assembled in order to form a flexible submarine pipe of the unbounded type, as described in the normative documents published by the American Petroleum Institute (API), API 17J and API RP 17B.

According to a third object, the object of the invention is a flexible submarine pipe which may be obtained by the aforementioned method.

The presence of a nanotube covalently bound to the polymer in a polymeric resin used as a layer of the flexible submarine pipe according to the invention has, in addition to improvement of the thermo-mechanical properties of the resin, the following advantages:

the thermo-mechanical properties of the resin may be adapted according to the percentage of nanotube introduced into the resin and on the nanotube used, more particularly according to the nature of A and therefore of the nature of the bond with the polymer (nature of the covalent bond (ester, amide, sulfonamide, . . . )), on the number of groups A which may form a chemical bond with the polymer, the resin is homogeneous since the nanotubes do not aggregate with each other, the resin may be obtained by using conventional devices and techniques for mixing and extruding, without an exfoliation step being necessary, the structure of the nanotube is chemically stable and over time, the absorption of water of the resin is decreased since the nanotubes make the resin more hydrophobic, the swelling of the resin is decreased, and/or the elongation at break of the resin is increased and the propagation of cracks in the resin layer is decreased while maintaining, or even improving the modulus, the impact strength and permeation.

These advantages allow the use of the flexible submarine pipe for transporting fluids. Thus, according to a fourth object, the object of the invention is the use of the aforementioned flexible submarine pipe for transporting fluids, notably gases or liquids, preferably hydrocarbons.

Other particularities and advantages of the invention will become apparent from reading the description made hereafter of particular embodiments of the invention, given as an indication but not as a limitation, with reference to the figures.

BRIEF DESCRIPTION OF THE DRAWINGS

In FIG. 2, A is a group which may form a covalent bond with the polymer. In FIG. 3, G is a group as defined above. In FIG. 4 the group which may form a covalent bond with the polymer is an —O-POSS group of formula $(RSiO_{1,5})_{10}$, it being understood that at least one group R represents a group G as defined above. In FIG. 5, two adjacent groups A are bound to each other through a POSS of formula —[(—$ORSiO_{1,0}$)($RSiO_{1,5}$)$_4$($HORSiO_{1,0}$)($O_{1,0}RSiO$—)]—.

DESCRIPTION OF PREFERRED EMBODIMENTS

Figure 1:
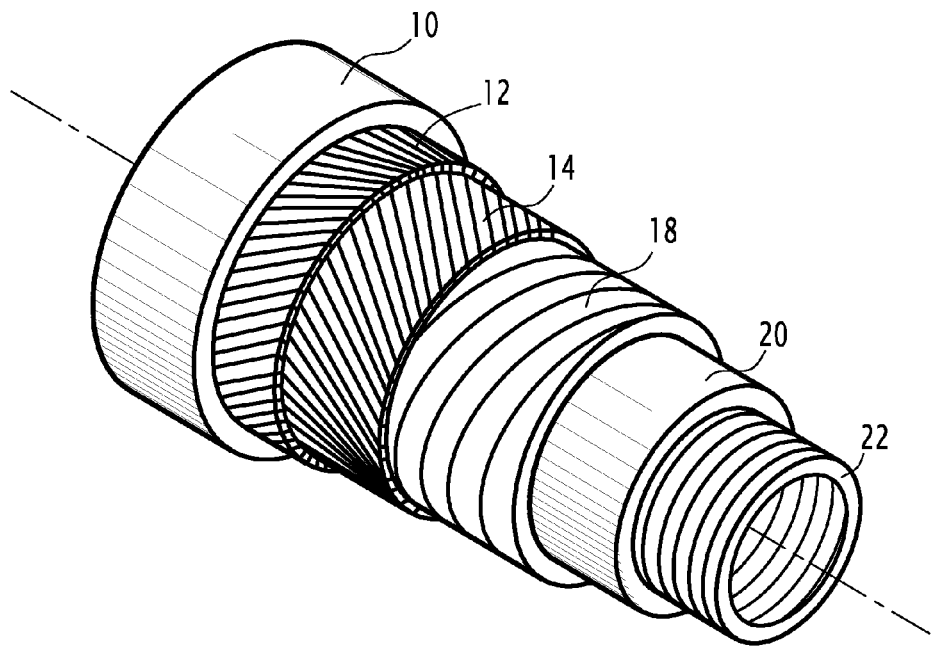
FIG. 1 is a schematic partial perspective view of a flexible pipe according to the invention.
Figure 2:
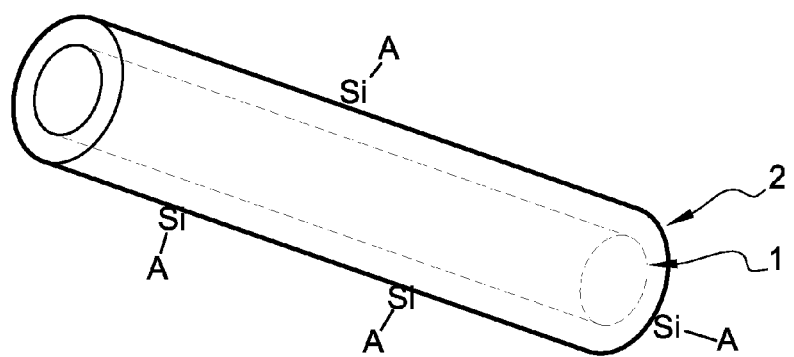
FIGS. 2, 3, 4 and 5 represent structures of nanotubes comprising a function A which may form a covalent bond with the polymer, each group A being bound to a silicon atom of the external sheet of the nanotube. In each of these figures, 1 represents the internal sheet, 2 the external sheet of the nanotube.
Figure 3:
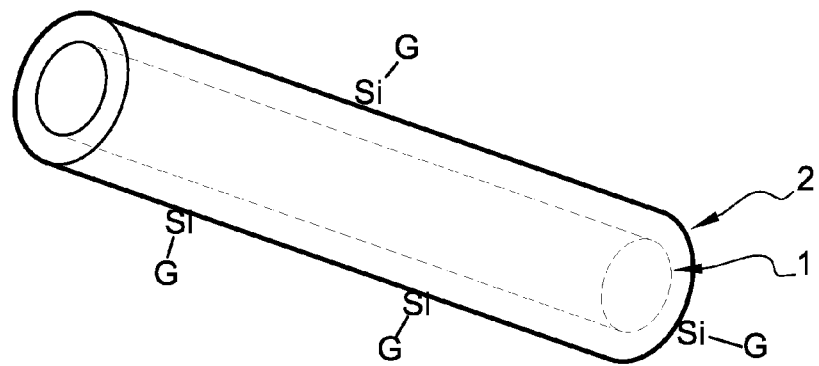
Figure 4:
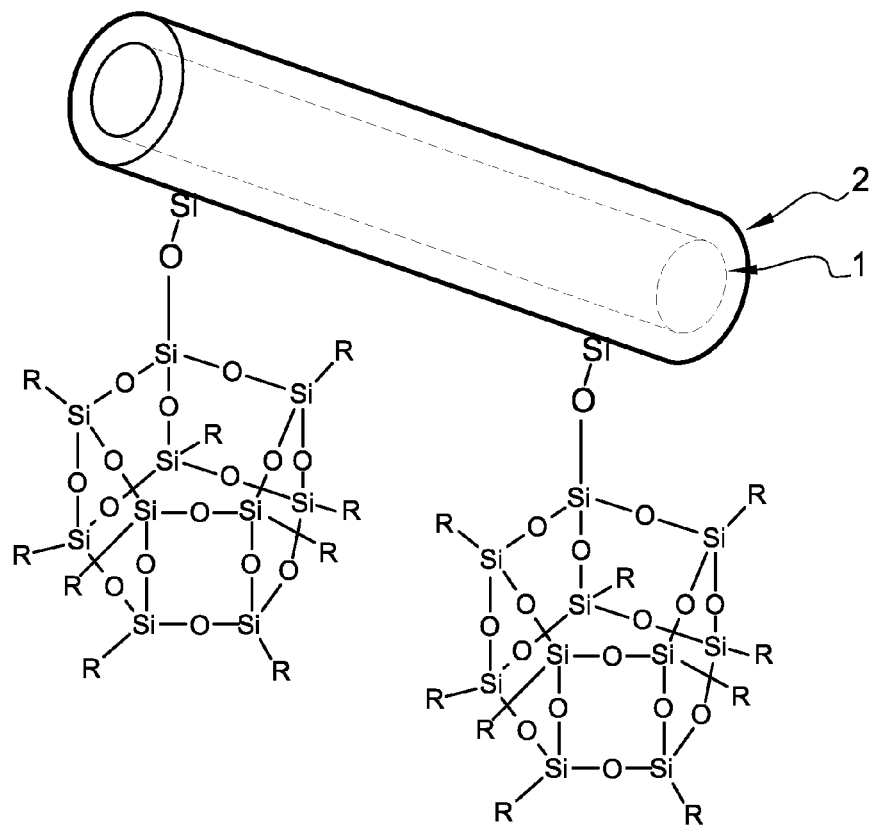
Figure 5:
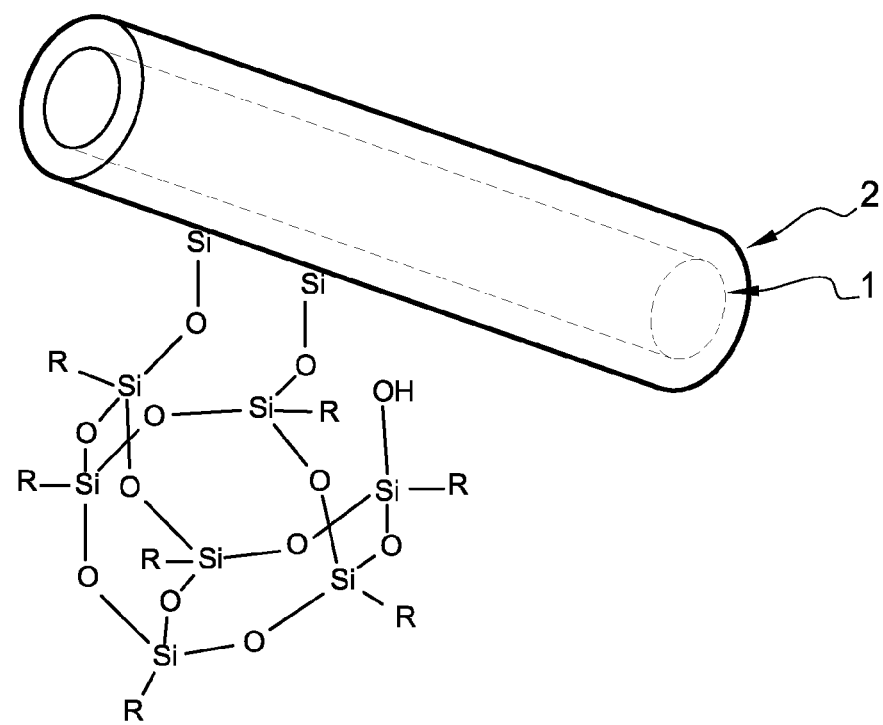

FIG. 1 illustrates a pipe according to the invention comprising, from the outside to the inside:
- an external so-called sealed polymeric sheath 10 (called external sheath),
- an external tensile armouring web 12, an internal tensile armouring web 14 wound in the opposite direction to the external web 12,
- a pressure vault 18 for absorbing radial forces generated by the pressure of the transported fluid,
- an internal so-called sealed polymeric sheath 20 comprising a polymeric resin comprising at least one alumino-silicate or magnesium silicate nanotube according to the invention, and
- an internal carcass 22 for absorbing radial crushing forces.

Because of the presence of the internal carcass 22, this pipe is said to be with a rough passage (rough bore). The invention may also be applied to a pipe, a so-called smooth passage pipe (smooth bore), not including any internal carcass.

Also, one would not depart from the scope of the present invention by suppressing the pressure vault 18, provided that the helical angle of the wires making up the armouring webs 12, 14 are closer to 55° and in the opposite direction.

The armouring webs 12, 14 are obtained by winding with a long pitch an assembly of wires in a metal or composite material, generally with a substantially rectangular section. The invention would also be applied if these wires had a section of circular or complex geometry, for example of the self-stapled T type. In FIG. 1, only two armouring webs 12 and 14 are illustrated, but the pipe may also include one or several additional pairs of armourings. The armouring web 12 is said to be external since it is the last here, starting from the inside of the piper, before the external sealed sheath 10.

The flexible pipe may also comprise layers not illustrated in FIG. 1, such as:
- a maintaining layer between the external polymeric sheath 10 and the tensile armouring webs 12 and 14 or between two tensile armouring webs,
- one or several anti-wear layers in a polymeric material in contact either with the internal face of the aforementioned maintaining layer, or with its external face, or with both faces, this anti-wear layer giving the possibility of avoiding wear of the maintaining layer in contact with metal armourings. The anti-wear layers, which are well known to one skilled in the art, are generally made by helical winding of one or several strips obtained by extrusion of a polymeric material based on polyamide, on polyolefins, or on PVDF (polyvinylidine fluoride). It is also possible to refer to document WO2006/120320 which describes anti-wear layers consisting of polysulfone strips (PSU), polyethersulfone (PES), polyphenylsulfone (PPSU), polyetherimide (PEI), polytetrafluoroethylene (PTFE), polyetheretherketone (PEEK) or polyphenylene sulfide (PPS) strips.

What is claimed is:

1. A flexible submarine pipe intended for transporting fluids comprising a plurality of layers, at least one layer of which comprises a polymeric resin comprising at least one alumino-silicate or magnesium silicate nanotube chemically bonded to the polymer through a covalent bond, wherein the flexible submarine pipe is an unbonded pipe.

2. The flexible submarine pipe according to claim 1, wherein the polymer and said at least one alumino-silicate or magnesium silicate nanotube are bonded through a bond of the ester, amide, amine, ether, thioether, urea, imine, imide, sulfonamide, carbamate, phosphate, siloxane, silane or carbon-carbon type.

3. The flexible submarine pipe according to claim 1, wherein the polymer comprises a polyethylene including lateral functional chains.

4. The flexible submarine pipe according to claim 1, wherein said at least one nanotube comprises a chemical compound selected from:
- an anti-corrosion agent, and/or
- a $CO_2$, $H_2S$, $O_2$ and/or $CH_4$ sensor, and/or
- an antioxidant agent.

5. The flexible submarine pipe according to claim 1, comprising, in addition to the layer comprising a polymeric resin comprising at least one alumino-silicate or magnesium silicate nanotube chemically bonded to the polymer through a covalent bond, one or more of the following layers:
- an external polymeric sheath, and/or
- at least one tensile armoring web, and/or
- optionally a pressure vault, and/or
- optionally a metal carcass.

6. The flexible submarine pipe according to claim 1, wherein the fluids are hydrocarbons.

7. The flexible submarine pipe according to claim 1, wherein the polymeric resin is a thermoplastic.

8. The flexible submarine pipe according to claim 1, wherein the polymer is a polyamide with or without functional lateral chains.

9. The flexible submarine pipe according to claim 1, wherein the polymer is a polyvinylidene fluoride including functional lateral chains.

10. A method for preparing a flexible submarine pipe according to claim 1, comprising the following steps:
    a) mixing a polymer and at least one alumino-silicate or magnesium silicate nanotube bearing at least one group A which may form a covalent bond with said polymer,
    b) extruding for forming a layer comprising said resin,
    c) assembling the layer obtained in step b) with at least one other layer.

11. The method according to claim 10, wherein said group A is:
    either a group G selected from:
    - a group selected from a halogen, —OH, —COOH, —$NH_2$, —SH, —$OSi(R_7)(R_8)(R_9)$ and an alkoxyl, and
    - a saturated, unsaturated or aromatic, linear, branched or cyclic hydrocarbon chain, substituted with one or several groups selected from Hal, —CO-Hal, —OCO-Hal, —SO$_2$-Hal, —COOH, —OH, —SH, —CN, —NCO, —OSi(R$_7$)(R$_8$)(R$_9$), —CR$_1$R$_2$-Hal, —NR$_1$H,

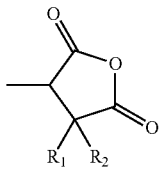 or 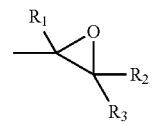 group, wherein:

R$_7$, R$_8$ and R$_9$ represent independently OH, an alkyl or an alkoxyl,

R$_1$, R$_2$ and R$_3$ represent independently H or a saturated, unsaturated or aromatic, linear, branched or cyclic hydrocarbon chain, itself optionally substituted with one or several groups selected from a halogen or a —CO-Hal, —OCO-Hal, —SO$_2$-Hal, —COOR$_4$, —COR$_4$, —CR$_4$R$_5$-Hal, —OR$_4$, —SR$_4$, —NR$_4$R$_5$, NR$_4$COR$_5$, —COR$_4$NR$_5$, —NR$_4$—CO—NR$_5$R$_6$, —O—CO—NR$_4$, —NR$_4$—CO—OR$_5$, —CN, —NO$_2$, —NCO,

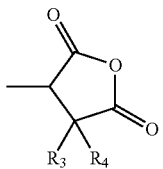 or 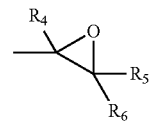 group, wherein R$_4$, R$_5$ and R$_6$ represent independently H or a saturated, unsaturated or aromatic, linear, branched or cyclic hydrocarbon chain, Hal represents a halogen selected from a chlorine, bromine and iodine, or a group —O-POSS, wherein POSS is a polyhedral oligomeric silsesquioxane:

of formula (RSiO$_{1,5}$)$_x$, wherein:

x represents an integer greater than or equal to 6 and less than or equal to 12, and R represents:

a group G as defined above, or a saturated, unsaturated or aromatic, linear, branched or cyclic hydrocarbon chain, it being understood that the groups R of each group RSiO$_{1,5}$ may be identical or different from each other and that at least one group R represents a group G, or of formula [(RSiO$_{1,5}$)$_{x'}$(XRSiO$_{1,0}$)$_{x''}$], wherein:

x' and x" represent independently of each other an integer, such that the sum of x' and of x" is greater than or equal to 6 and less than or equal to 12, and R is as defined above, and X represents a group G as defined above, the groups X of each group XRSiO$_{1,0}$ which may be identical or different with each other and identical with or different from the Rs, it being understood that adjacent groups A may be bound to each other through a POSS.

12. The method according to claim 11, wherein said group A is selected from:

a group G' selected from an alkoxyl, —OH and —OSi (R$_7$)(R$_8$)(R$_9$) group, wherein R$_7$, R$_8$ and R$_9$ represent independently OH, an alkyl or an alkoxyl group, and a group O-POSS, wherein POSS is:

of formula (R'SiO$_{1,5}$)$_x$ wherein x represents an integer greater than or equal to 6 and less than or equal to 12, and wherein R' represents:

a group G' as defined above, or a saturated, unsaturated or aromatic, linear, branched or cyclic hydrocarbon chain, it being understood that the groups R' of each group R'SiO$_{1,5}$ may be identical or different from each other and that at least one group R' represents a group G', or of formula [(R'SiO$_{1,5}$)$_{x'}$(G'R'SiO$_{1,0}$)$_{x''}$], wherein:

x' and x" represent independently of each other an integer with x' different from 0, such that the sum of x' and of x" is greater than or equal to 6 and less than or equal to 12, and R' is as defined above, and the groups G' of each group G'R'SiO$_{1,0}$ may be identical or different from each other and identical with or different from the R's.

13. The method according to claim 12, wherein said group A is a group G' selected from an alkoxyl, —OH and —OSi(R$_7$)(R$_8$)(R$_9$) group, wherein R$_7$, R$_8$ and R$_9$ represent independently OH, an alkyl or an alkoxyl group.

14. The method according to claim 10, wherein:

the polymer is a polyamide optionally comprising functional lateral chains and said at least one nanotube is a bearer of at least one —OH, NH$_2$ or COOH group, the polymer is a polyethylene including functional lateral chains bearing groups of formula —Si—(OR$_{10}$)(OR$_{11}$)(OR$_{12}$), wherein R$_{10}$, R$_{11}$ and R$_{12}$ are independently alkyl groups and said at least one nanotube is a bearer of at least one —OH, —OSi(R$_7$)(R$_8$)(R$_9$) or alkoxyl group, wherein R$_7$, R$_8$ and R$_9$ represent independently OH, an alkyl or an alkoxyl group, or the polymer is a polyvinylidene fluoride including functional lateral chains bearing COOH or anhydride groups, and said at least one nanotube is a bearer of at least one —OH group.

15. The method according to claim 10, comprising a subsequent step d) for cross-linking the assembly obtained during step c) when the covalent bond which may be formed between the group A borne by the alumino-silicate or magnesium silicate nanotube and the polymer is a siloxane bond.

16. The method according to claim 10, for preparing a flexible submarine pipe comprising at least one layer comprising a polyethylene polymeric resin including lateral chains of formula —CH$_2$—CH$_2$—Si—(OR$_{10}$)(OR$_{11}$)(OR$_{12}$), wherein R$_{10}$, R$_{11}$ and R$_{12}$ are independently alkyl groups, comprising the steps of:

a$_1$) melting a polyethylene polymer, a$_2$) adding a vinylsilane derivative of formula CH$_2$=CH—Si—(OR$_{10}$)(OR$_{11}$)(OR$_{12}$), a peroxide initiator and at least one alumino-silicate or magnesium silicate nanotube bearing a hydroxyl, trialkoxysilane or alkoxyl group in order to obtain a polyethylene including functional lateral chains, a$_3$) mixing with polyethylene, a catalyst of the cross-linking reaction, optionally an antioxidant and/or a stabilizer, b) extruding for forming a layer comprising said resin, c) assembling the layer obtained in step b) with at least one other layer, d) cross-linking the assembly obtained during step c), it being understood that steps a$_2$, a$_3$ and b) may be carried out simultaneously.

17. A flexible submarine pipe which may be obtained by a method according to claim 10.

18. A method for transporting fluids comprising the use of a flexible submarine pipe according to claim 1.

19. The method according to claim 18, wherein the fluids are hydrocarbons.

\* \* \* \* \*